United States Patent Office 2,955,046
Patented Oct. 4, 1960

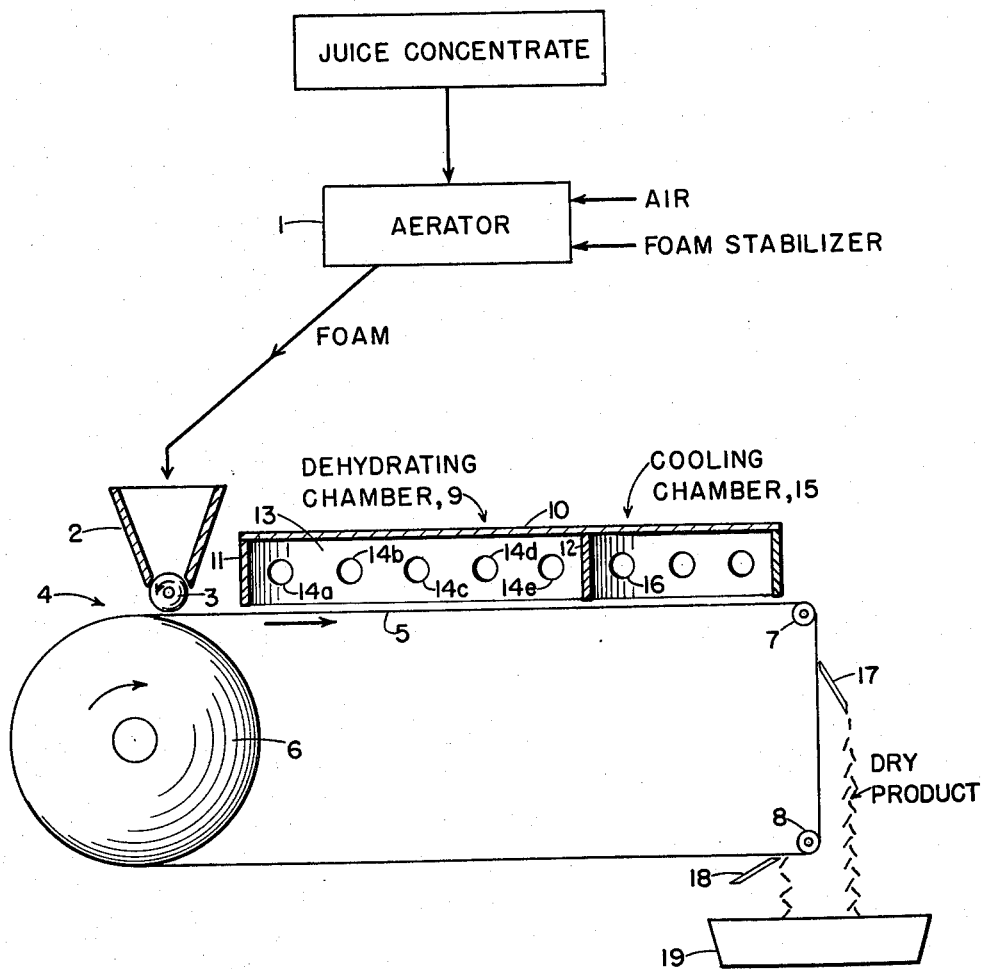

2,955,046

CONTINUOUS PROCESS OF DEHYDRATING FRUIT AND VEGETABLE JUICES

Arthur I. Morgan, Jr., Berkeley, and Lewis F. Ginnette, San Leandro, Calif., assignors to the United States of America as represented by the Secretary of Agriculture Filed Dec. 16, 1958, Ser. No. 780,906

1 Claim. (Cl. 99—206)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of improved process for dehydrating fruit and vegetable juices. A particular object of the invention is the provision of processes wherein the dehydration is conducted continuously and under atmospheric pressure to yield porous products which can be readily and easily reconstituted to form a juice having flavor, color, and nutrient value essentially the same as in the original juice. Further objects and advantages of the invention will be apparent from the following description, wherein parts and percentages are by weight unless otherwise specified.

The single figure in the annexed drawing depicts schematically a flow sheet of the process of the invention and apparatus with which it may be carried out.

In the dehydration of fruit and vegetable juices a principal problem lies in the difficulty of obtaining products which will reconstitute readily. The mere subjection of juices to conventional dehydrating conditions such as exposing them to hot air or to the heated surface of a drum dryer will yield a dense, leathery product which has no practical value as it is virtually impossible to reconstitute. Recently, it has been shown that fruit and vegetable juices can be successfully dried by exposing a layer of concentrated juice to vacuum under temperature conditions at which the juice remains in a puffed or expanded condition. Although this process yields an excellent product, it requires expensive equipment because the drying mechanism must be in a vacuum-tight system and the maintenance of the vacuum by steam ejection or the like during dehydration involves a considerable expense.

In accordance with the present invention the dehydration is accomplished under normal (atmospheric) pressure instead of under vacuum. Despite this departure from currently accepted procedures, the dehydrated products of the invention are in a porous condition and are easily rehydratable. In addition, the dehydration is accomplished without material damage to the color, flavor, and nutritive content of the juice. Since the dehydration is carried out at normal pressure, relatively inexpensive equipment may be used and operating expenses are minimized. A particular feature of the present process is that it is of a continuous nature whereby significant advantages are gained, namely, more efficient operation, reduction in running expenses, and production of a product of uniform properties.

The process of the invention is further explained as follows, with reference to the annexed drawing: A liquid juice concentrate, for example tomato juice concentrate, is fed into aerator 1 which may take the form of a conventional device commonly used for aerating ice cream, salad dressings, or the like. Air and a foam stabilizer are likewise fed into aerator 1 to provide a foam of the proper volume and stability. The juice concentrate, now in the form of a foam, is fed into hopper 2 of dehydrator 4.

Dehydrator 4 includes a flexible, endless belt 5 made of rubber—natural or synthetic—which is tautly disposed about drum 6 and rollers 7 and 8. Drum 6 is driven by suitable mechanism to continuously traverse belt 5 in the direction shown.

Hopper 2 and driven feed roller 3 extend in width essentially the same distance as the width of belt 5. Roller 3 in cooperation with hopper 2 deposits on belt 5 a thin layer of the foam. By suitable adjustment of the position of hopper 2 and roller 3 above belt 5 and control of the speed of feed roller 3, the foam is deposited in a thin layer on the order of 0.01 to 0.2 inch.

The layer of foam on belt 5 is carried through dehydrating chamber 9 wherein it is dehydrated by contact with hot air. Dehydrating chamber 9 takes the form of a bottomless compartment, essentially as wide as belt 5, and is formed by top plate 10, end plates 11 and 12, and side plates 13, only one of the latter being shown in the drawing. Ports 14a, 14b, 14c, 14d, and 14e are provided for introduction of hot air. This hot air flows transversely across the layer of foam causing it to be dehydrated forming a solid, porous product. Ports or other suitable vents are provided in the opposite side wall 13 of chamber 9 not shown in the drawing. It is evident that the length of chamber 9, i.e., the distance from plate 11 to plate 12 is long enough to permit the layer of foam to be dehydrated in the time of its passage through the chamber. Chamber 9 is not sealed from the atmosphere and the pressure therein is essentially normal atmospheric pressure.

The temperature of the hot air entering dehydrating chamber 9 via ports 14a, 14b, etc. may range about from 120 to 220° F. During this dehydration, it is necessary that the volume of the foam be retained whereby to yield a final product in porous, easily reconstitutable form. To insure such a result, the foam layer may be kept under observation during dehydration and the temperature of the air reduced if the foam shows a tendency to decrease in volume. Thus, although it is desirable to use a high air temperature to obtain a rapid elimination of moisture, the air temperature should not be so elevated as to cause any substantial reduction in the volume of the foam. It is impossible to set forth numerical temperature limits in this connection because the stability of the foam will depend on many factors including efficacy of the foam stabilizing agent used, the temperature of the foam, moisture content of the foam, proportion of dissolved solids and insoluble solids in the foam, state of subdivision of the insoluble solids in the foam, chemical nature of fruit or vegetable materials in the foam, size of gas bubbles in the foam, rate of heating of the foam, etc. However, in any particular instance the air temperature may be controlled in accordance with visual observation and this system of control affords a more reliable guide than could numerical limits. To provide for such visual observation, the walls of chamber 9 may be provided with windows, sight glasses, or the like.

It is evident that as the layer of foam passes through chamber 9, its temperature will rise and eventually equal that of the hot air stream. To minimize alteration of the natural flavor by the product assuming too high a temperature, it is preferred to employ hot air at reduced temperature during the final stages of the dehydration. For example, the air entering adjacent to the exit end of the dehydrating chamber, for instance through ports 14d and 14e may be at a maximum of about 120–160° F. whereby the product temperature will not rise above these limits. Suitable partitions similar to vertical plate 12 may be provided with chamber 9 to delineate the zones having hot air at different temperature levels.

After leaving dehydrating chamber 9, the dehydrated product is next transported by the belt to cooling chamber 15 which is constructed essentially the same as dehydrating chamber 9. Ports 16 are provided to contact the dehydrated product with a current of cool air. Chamber 15 is not sealed from the atmosphere and the pressure therein is essentially normal or atmospheric pressure. The product as it leaves the dehydrating chamber is generally in a plastic state and would be relatively difficult to remove from the belt. By applying cooling the product is put into a brittle state which facilitates its removal from the belt. Air having a low humidity is preferably employed in the cooling step to prevent moisture regain by the dry product. Generally, the volume and temperature of the air circulated through chamber 15 are so regulated to reduce the product to a temperature of 100° F. or below, usually to about room temperature (70° F.).

The cool, dehydrated product is then carried by belt 5 about rollers 7 and 8. These rollers are deliberately of a small size so that the belt is subjected to a sudden change in direction. Belt 5 being of flexible, rubbery material is able to repeatedly negotiate this abrupt turn without damage. However, the cooled, dehydrated product being now in a brittle condition is cracked into pieces and dislodged from the belt as it traverses rollers 7 and 8. The product now in the form of flakes or pellicles falls into receiver vessel 19. Doctor blades 17 and 18, spaced a small distance from the surface of belt 5, assist in freeing the loosened particles of product.

An important feature of the invention lies in the method of dislodging the dehydrated product from the belt 5. This method involves traversing the belt in a path which involves an abrupt change in direction. As a result the outer fibers of the belt are stretched relative to the inner fibers with the result that the product—being brittle—is cracked into fragments and dislodged from the belt. The desired effect is readily attained by conducting the belt over a guide member—such as a roller—with a change in direction or turn of at least 90°. The thickness of the belt and the radius of the guide member are so correlated that the outer fibers of the belt are elongated at least 5%, relative to elongation of the inner fibers—those contacting the guide member. The following formula may be used to obtain the desired correlation:

$$\frac{r+t}{r} = e$$

wherein $r$ is the radius of the guide member, $t$ is the thickness of the belt, and $e$ is the ratio of the elongation of the outer fibers to that of the inner fibers. In using the formula, the values of $r$ and $t$ are so chosen that $e$ has a value of 1.05 or more. For example, if the belt is 0.1 inch thick, a guide member having a radius of 2 inches will produce a relative elongation of 1.05, that is, the outer fibers will be stretched 5% more than the inner fibers. A greater degree of stretch, say 10%, would be obtained with the same belt conducted over a guide member having a radius of one inch. Inasmuch as this stretching of the outer fibers of the belt is employed to release the dehydrated product, it is necessary that the belt be made of rubbery material so that it may withstand this stress without damage. Use of the above-described method of removing the dehydrated product from the belt offers the particular advantage that the use of belt-contacting scrapers or doctors is eliminated. Such devices rarely give satisfactory results because they score the belt surface and usually leave a thin film of dried material which as it builds up with continued operation interferes with proper operation and may contaminate the product with particles of hard, varnish-like dried fruit or vegetable material.

The process of the invention may be employed to prepare dehydrated products from any fruit or vegetable juice, for example, the juices of orange, grapefruit, lemon, lime, apple, pear, apricot, strawberry, raspberry, pineapple, grape, prune, plum, peach, cherry, tomato, celery, carrot, spinach, lettuce, cabbage, watercress, etc. The juices may be prepared in conventional manner as by subjecting the edible portions of the fruit or vegetable material to such unit operations as reaming, pressing, macerating, crushing, comminuting, or extracting with water. The juice may be clear or contain suspended pulp. In preparing the foam for dehydration it is necessary to start with a juice in liquid concentrate form. Juices in their usual state are too thin and watery to form stable foams. Methods of forming fruit and vegetable juices into liquid concentrates are of course well known in the art. A typical method involves evaporating the juice under vacuum at a relatively low temperature, for example 50 to 150° F., to avoid heat damage to the product. For use in the process of the invention, the concentrate should have a solids content of at least 20% by weight. There is no upper limit in the solids content as long as the concentrate is liquid. Depending on the concentration of solids and the proportion of suspended pulp, the concentrates may be syrupy, sauce-like, or even of pasty consistency. Any such materials are considered as being liquids since they have fluid properties. It is generally preferred to employ concentrates which have as high a solids content as is compatible with retention of fluid character whereby the proportion of moisture which must be removed in the dehydration step in accordance with the invention is minimized.

The step of forming the liquid juice concentration into a foam prior to dehydration is an important step in the process of the invention. It enables the production of a porous easily reconstituted product even though the dehydration is conducted at atmospheric pressure. The significance of the foam condition is explained as follows: The foam consists of a body of the juice concentrate throughout which is interspersed a multitude of gas bubbles. The presence of the bubbles gives the foam a volume substantially greater than that of the juice concentrate, per se. During the dehydration step, the mass of foam retains this expanded volume with the result that the final product is a brittle, sponge-like, porous mass consisting of a matrix of solid fruit or vegetable material in which is interspersed a multitude of voids. This porous mass readily breaks up to form a product in the form of flakes. These flakes on addition to water and stirring by hand for a few seconds form a reconstituted juice free from lumps or other undispersed particles. The fact that the initial concentrate is applied to dehydration in the form of a foam and that the volume thereof is maintained during dehydration are the keys to the formation of the easily rehydrated porous product. Moreover, by such means the dehydration takes place rapidly and efficiently because moisture can diffuse readily out of the expanded mass.

In preparing the foam, a foam stabilizing agent is added to the liquid juice concentrate and air or other non-toxic gas such as nitrogen, carbon dioxide, nitrous oxide, helium, propane, n-butane, isobutane, dichlorodifluoromethane, trichloromonofluoromethane, trifluoromono chloromethane, etc. is incorporated therein. The chemical nature of the foam stabilizing agent is of no moment to the operability of the invention as long as the agent possesses the ability to stabilize foams. Various examples of suitable agents are listed hereinafter. The proportion of foam stabilizing agent will vary depending on the properties of the juice concentrate, the properties of the agent in question, etc. In general, the proportion of the agent may vary about from 0.1 to 4.0%, by weight based on the weight of solids in the concentrate. It is naturally desirable to use the lowest proportion of foam stabilizing agent compatible with production of a stable foam. Thus in any particular case, pilot trials may be conducted with different proportions of stabilizing agent and noting the stability of the foam after incorporation of gas. The stability of the foams may be easily determined by allowing the test batches of foam to stand at room temperature. A suitably stable foam is one which will retain its volume without any separation of gas from liquid for at least ½ hour, preferably at least one hour, when allowed to stand at room temperature.

Incorporation of the gas into the concentrate containing added foam stabilizing agent may be accomplished by any of the conventional methods used for example in aerating ice cream, salad dressings, and the like. A simple and efficacious expedient is to subject the concentrate to a rotating wire whip which beats air into the material. Another plan is to pump the concentrate through a conduit, or portion of which is of restricted cross-section to form a venturi, the gas being introduced at the zone of high velocity and low pressure within the venturi and so thoroughly commingled with and dispersed into the concentrate. For best results, it is preferred that the gas bubbles in the foam be of uniform small size, i.e., about 100 microns or less in diameter. The proportion of gas incorporated into the concentrate is generally regulated so that the gasified concentrate (foam) has a volume at least 1.5 times that of the concentrate prior to introduction of the gas. It is usually preferred that the foam have a volume about 2 to 3 times the volume of the concentrate to ensure formation of a highly porous dehydrated product. The foam volume may be increased above these levels to obtain even more highly porous products. Usually, however, it is desirable to limit the volume increase to about 5 times the original concentrate volume to avoid getting products having too low bulk density. That is, if excessive amounts of gas are added to the concentrate the dehydrated products although otherwise completely suitable from the standpoint of rehydration, taste, and color, will require too large a container to package a unit weight of product.

The concentrate may be cooled during introduction and dispersion of the gas therein; this generally promotes formation of a stable foam. If cooling is employed, any temperature below room temperature may be used provided the mass is not cooled enough to freeze it. Accordingly, temperatures not lower than about 35° F. are recommended.

As noted hereinabove, a foam stabilizing agent is incorporated into the juice concentrate so as to enable preparation of a stable foam. A multitude of such agents are known and the invention encompasses the use of any of them. The foam stabilizer may be a surface active agent or a hydrophilic colloid or a mixture of the two.

Typical examples of classes of surface active agents and individual compounds which may be used are listed below—

Fatty acid monoesters of inner ethers of hexitols, the fatty acids containing at least six carbon atoms. Illustrative of this class are sorbitan monolaurate, sorbitan monomyristate, sorbitan monopalmitate, sorbitan monostearate, sorbitan monooleate, and sorbitan monolineate. The corresponding fatty acid esters of mannitan may also be used.

Condensation products of ethylene oxide with sorbitan or mannitan monofatty acid esters. Typical among these compounds are ethylene oxide condensates of sorbitan monolaurate, sorbitan monomyristate, sorbitan monopalmitate, sorbitan monostearate, sorbitan monooleate, and the like. These condensates may contain anywhere from 6 to 60 moles of ethylene oxide per mole of sorbitan monoester.

Condensation products of ethylene oxide with long-chain carboxylic acids, that is, compounds of the formula $$R\text{---}CO\text{---}(CO_2H_4)_n\text{---}OH$$

where R—CO is the acyl radical of a fat acid such as lauric, palmitic, oleic, stearic, etc. and $n$ has a value from 6 to 60.

Condensation products of ethylene oxide with long-chain aliphatic alcohols, i.e., compounds of the formula $$R\text{---}(OC_2H_4)_n\text{---}OH$$

wherein R is the hydrocarbon radical of a long-chain alcohol such as dodecyl, tetradecyl, hexadecyl, octadecyl, oleyl, etc. and $n$ has a value from 6 to 60.

Mono- or di-esters of sucrose and fatty acids containing at least six carbon atoms. Illustrative compounds of this class are sucrose monolaurate, sucrose monomyristate, sucrose monopalmitate, sucrose monostearate, sucrose monooleate, sucrose dilaurate, sucrose dimyristate, sucrose dipalmitate, sucrose distearate, sucrose dioleate, and the like.

Monoglycerides of higher fatty acids, for example, glycerol monolaurate, glycerol monomyristate, glycerol monopalmitate, glycerol monostearate, glycerol monooleate.

Salts of higher fatty acids, for example, sodium palmitate, sodium stearate, sodium oleate, or mixtures thereof.

Higher alkyl sulphates, as for example, sodium dodecyl sulphate, sodium tetradecyl sulphate, sodium hexadecyl sulphate, solium octadecyl sulphate, sodium oleyl sulphate.

Higher alkyl sulphonates, e.g., sodium dodecane sulphonate, sodium tetradecane sulphonate, sodium hexadecane sulphonate, sodium octadecane sulphonate, sodium oleyl sulphonate.

Alkylaryl sulphonates such as the sodium alkyl ($C_8$–$C_{20}$) benzene sulphonates. Typical in this class are sodium dodecyl benzene sulphonate and sodium hexadecyl benzene sulphonate.

Alkyl esters of sulphosuccinic acid, for example, the sodium salt of dioctyl sulphosuccinate.

Sulphonated or sulphated fatty acid esters or amides, i.e., compounds of the types:

$$RCO\text{---}O\text{---}CH_2\text{---}CH_2\text{---}SO_3Na,$$
$$RCO\text{---}NH\text{---}CH_2\text{---}CH_2\text{---}SO_3Na,$$
$$RCO\text{---}O\text{---}CH_2\text{---}CH_2\text{---}OSO_3Na,$$

and $RCO\text{---}NH\text{---}CH_2\text{---}CH_2\text{---}OSO_3Na$, wherein RCO— represents the acyl radical of a long-chain fatty acid such as lauric, myristic, palmitic, stearic, oleic, etc.

Condensates of ethylene oxide and alkyl phenols, that is, compounds of the type—$R\text{---}C_6H_4\text{---}(OC_2H_4)_nOH$ wherein R represents an alkyl radical containing 6 to 20 carbon atoms and $n$ has a value of about 6 to 30.

Salts of bile acids, for example, bile salts as obtained from animal sources or alkali metal salts of individual bile acids such as cholic acid, dehydrocholic acid, desoxycholic acid, hydrodesoxycholic acid, dehydrodesoxycholic acid, dehydrodesoxycholic acid, lithocholic acid, glycholic acid, or taurocholic acid.

It will of course be appreciated that the particular surface active agent for use in the process of the invention will be selected according to the use which is to be made of the final product. Thus where the product is intended for edible purposes, the surface active agent selected will be one which is edible or at least which may be ingested without adverse effects. Thus for the production of edible products, we prefer to use surface active agents of the class of sucrose mono- or di-esters with higher fatty acids, agents of the class of glycerol monoesters of higher fatty acids, or agents of the class of polyoxyethylene derivatives of higher fatty acids, e.g., polyoxyethylene monostearate.

Typical examples of hydrophilic colloids which may be employed are: soluble starch, sodium carboxymethyl cellulose, methyl cellulose, polyvinylpyrrolidone, agar, gum tragacanth, gum arabic, gum acacia, gum karaya, carragheen, alginic acid, sodium alginate, pectin, dextran, sodium carboxymethyl starch, sodium carboxymethyl amylose, sodium carboxymethyl amylopectin, pentosans, albumin, gelatin, dried egg white, sodium gluten sulphate, sodium gluten phosphate, and the like.

The invention is further demonstrated by the following illustrative example.

*Example*

The starting material was a tomato juice concentrate containing 30% solids and of a pasty consistency. To 100 parts of this concentrate was added 0.45 part of dry hen egg albumen (1.5% based on solids content of the concentrate). The albumen-containing concentrate was then subjected to the action of a power-operated wire whip rotating at about 700 r.p.m. to incorporate air therein. This whipping was continued until the foam leaving the device had a volume 2.5 times that of the original volume of the concentrate.

The foam was then dehydrated on a device as described above. To this end, the foam was applied to a neoprene belt in a layer 0.1 inch thick. The foam was then conveyed through the dehydrating chamber wherein it was contacted with hot air at 160° F. for a residence time of one hour. The dehydrated product (moisture content 1.5%) was then conveyed through a cooling chamber where it was contacted with cool air until the temperature of the product was 100° F. The belt carrying the cool, dehydrated product was then passed around a pulley of ¼ inch diameter whereby the product was dislodged from the belt as small flakes or platelets having a porous structure. This product was promptly packaged in moisture-tight containers.

It was observed that the product exhibited good rehydration properties. Thus by adding water (94 parts) to a sample of the product (6 parts) and hand stirring with a spoon, a reconstituted tomato juice free from lumps or grittiness was produced in 30 seconds or less. The reconstituted juice showed no tendency of phase separation. By variation in the relative proportions of product and water, one could prepare a reconstituted juice, concentrate, or paste as desired.

Having thus described our invention, we claim:

A process for dehydrating a liquid concentrate selected from the group consisting of fruit juice concentrates and vegetable juice concentrates which comprises incorporating a gas and a foam stabilizing agent into the concentrate to produce a stable foam, continuously applying the foam in the form of a thin layer on a flexible elastic support, continuously transporting said support bearing the layer of foam through a dehydration zone wherein the foam is contacted at normal atmospheric pressure with hot air having a temperature, within the range about from 120 to 220° F., insufficiently high to cause the foam to decrease in volume and continuing said contact of the hot air with the foam until the foam is dehydrated forming a solid, porous product, continuously transporting said support bearing the layer of dehydrated product through a cooling zone wherein the product is cooled at normal atmospheric pressure in an atmosphere of low humidity to a temperature below 100° F., continuously conducting said support bearing the layer of cooled, dehydrated product in a path which includes an abrupt change in direction whereby the cooled, dehydrated product is broken into pieces and dislodged from the support, and collecting the said product.

References Cited in the file of this patent

UNITED STATES PATENTS

| | | |
|---|---|---|
| 2,393,561 | Perech | Jan. 22, 1946 |
| 2,490,951 | Dunkley | Dec. 13, 1949 |
| 2,785,077 | Kaufman | Mar. 12, 1957 |
| 2,854,343 | Strashun et al. | Sept. 30, 1958 |
| 2,858,226 | Kaufman et al. | Oct. 28, 1958 |